(12) United States Patent
Coates et al.

(10) Patent No.: US 7,095,311 B2
(45) Date of Patent: Aug. 22, 2006

(54) IDENTIFICATION CODING SCHEMES FOR MODULATED REFLECTANCE SYSTEMS

(75) Inventors: Don M. Coates, Santa Fe, NM (US); Scott D. Briles, Los Alamos, NM (US); Daniel L. Neagley, Albuquerque, NM (US); David Platts, Santa Fe, NM (US); David D. Clark, Santa Fe, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 10/723,073

(22) Filed: Nov. 25, 2003

(65) Prior Publication Data

US 2005/0110614 A1    May 26, 2005

(51) Int. Cl.
*H04Q 5/22* (2006.01)
(52) U.S. Cl. .................. 340/10.41; 340/10.33; 340/10.1; 340/10.2; 340/10.3; 340/10.4; 340/10.5
(58) Field of Classification Search ............ 340/10.41, 340/10.33, 10.1, 10.2, 10.3, 10.4, 10.5
See application file for complete search history.

(56) References Cited

U.S. PATENT DOCUMENTS

| | | | | |
|---|---|---|---|---|
| 3,321,756 A | * | 5/1967 | Slaght | 342/51 |
| 3,624,631 A | * | 11/1971 | Chomet et al. | 340/568.1 |
| 4,075,632 A | * | 2/1978 | Baldwin et al. | 342/51 |
| 5,181,975 A | * | 1/1993 | Pollack et al. | 152/152.1 |
| 5,247,305 A | * | 9/1993 | Hirata et al. | 342/44 |
| 5,387,993 A | * | 2/1995 | Heller et al. | 398/151 |
| 5,448,242 A | * | 9/1995 | Sharpe et al. | 342/42 |
| 5,731,754 A | * | 3/1998 | Lee et al. | 340/447 |
| 5,995,006 A | * | 11/1999 | Walsh | 340/10.1 |
| 6,054,925 A | * | 4/2000 | Proctor et al. | 340/572.7 |
| 6,278,361 B1 | * | 8/2001 | Magiawala et al. | 340/438 |
| 6,342,830 B1 | * | 1/2002 | Want et al. | 340/10.1 |
| 6,351,215 B1 | * | 2/2002 | Rodgers et al. | 340/572.1 |
| 6,359,556 B1 | * | 3/2002 | Katou | 340/506 |
| 6,434,372 B1 | | 8/2002 | Neagley et al. | 455/106 |
| 6,591,671 B1 | * | 7/2003 | Brown | 73/146.5 |
| 6,662,091 B1 | * | 12/2003 | Wilson et al. | 701/33 |
| 6,747,562 B1 | * | 6/2004 | Giraldin et al. | 340/573.1 |

OTHER PUBLICATIONS

Scott D. Briles et al., "Remote Down-Hole Telemetry," U.S. Appl. No. 10/187,025, filed Jun. 28, 2002.

* cited by examiner

*Primary Examiner*—Jeffery Hofsass
*Assistant Examiner*—Scott Au
(74) *Attorney, Agent, or Firm*—Milton D. Wyrick; Mark N. Fitzgerald (57) ABSTRACT

An identifying coding apparatus employing modulated reflectance technology involving a base station emitting a RF signal, with a tag, located remotely from the base station, and containing at least one antenna and predetermined other passive circuit components, receiving the RF signal and reflecting back to the base station a modulated signal indicative of characteristics related to the tag.

16 Claims, 6 Drawing Sheets

Example case $0 < R3 < R1 = R5 < R2 < R4 < \infty$
Antennas A1-A5 each tuned to a different frequencies, F1-F5.

FIG. 1

Example case 0<R3<R1=R5<R2<R4<∞
Antennas A1-A5 each tuned to a different frequencies, F1-F5.

Signature of reflected signal as encoded by impedence elements.

Example case 0<R3>R1=R5<R2<R4<∞
Antennas A1, A2, A4 and A5 phased together, A3 phase 180° out from other antennas.

Signature of reflected signal as encoded by resistor elements and phasing of antennas.

FIG. 4C $X_L = 2\pi FC$ $X_C = \dfrac{1}{2\pi FC}$

When $X_L = X_C$, the incoming signal is absorbed compared to any other Freq,

FIG. 5A

This circuit selectively reflects one frequency efficiently but absorbs at others.

FIG. 5B

Capacitor CV changes due to spacing changes of the two capacitor electrodes.

FIG. 6A

Resistor Rv, e.g. a carbon loaded resistor reduces resistance at higher pressures when compressed.

FIG. 6B

FIG. 7A  Modulated Reflectance Label  FIG. 7B

FIG. 8A  FIG. 8B

IDENTIFICATION CODING SCHEMES FOR MODULATED REFLECTANCE SYSTEMS

The present invention generally relates to electronic identification apparatus, and, more specifically, to identification coding in modulated reflectance systems. This invention was made with Government support under Contract No. W-7405-ENG-36 awarded by the U.S. Department of Energy. The Government has certain rights in the invention.

BACKGROUND OF THE INVENTION

Modulated reflectance is a technology that has multiple uses for low power RF telemetry and communication applications of many types. A full description of basic modulated reflectance operation is contained in U.S. Pat. No. 6,434,372, issued Aug. 13, 2002, to Neagley et al. One application of this technology is described in U.S. patent application Ser. No. 10/187,025, filed Jun. 28, 2002, by Briles et al., entitled "Remote Down-Hole Telemetry."

The basic principles of modulated reflectance, as described in the issued patent above, are:
1. The "base unit" sends a carrier RF signal to a "remote unit", also known as the reflector unit.
2. The "remote unit" modulates the RF signal and reflects a portion of the modulated signal back to the "base unit."
3. The "base unit" receives the modulated signal from the "remote unit," completing two-way communication.

The advantages of the modulated reflectance technology are many, but one of the most important is the fact that the "remote unit" requires either no or minimal power to reflect the signal back to the "base unit." Therefore, in many cases, the "remote unit" does not require batteries or other sources of electrical power. This is an important advantage for portable or remotely located modulated reflection devices.

These features of modulated reflectance make it of use in many applications. Among these are oil well logging, local-area computer networks, and cell phone related applications. However, the present invention applies the technology in diverse situations in which remote monitoring of persons or equipment without a power source on the remote unit is important.

All of the embodiments disclosed herein are directed toward identification and location methods for persons and property. Although for different applications, each embodiment shares the primary concept of this invention.

SUMMARY OF THE INVENTION

In order to achieve the objects and purposes of the present invention, and in accordance with its objectives, an identifying coding apparatus employing modulated reflectance technology comprising a base station emitting a RF signal, with a tag, located remotely from the base station, and containing at least one antenna and predetermined other passive components, receiving the RF signal and reflecting back to the base station a modulated signal indicative of characteristics related to the tag.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION

The present invention utilizes modulated reflectance techniques to remotely identify and locate persons and property. The invention can be understood most easily through reference to the following description and to the drawings.

Initially it should be understood that use of the word "passive" herein relates to circuit components that need no power source to operate and that are not semi-conductor components.

The invention provides new devices that take advantage of modulated reflectance principles and have new properties that are of high commercial value. These devices include a "bar code" like system that uses radio-frequency (RF) techniques instead of the current optical scanning methods. An RF bar code system according to the present invention has the potential to replace the current cumbersome optical system, and to eliminate the need for re-handling of purchased items that frequently cannot be read by the optical system, and to greatly cut the time a store devotes to inventory and control of its goods. Key to this embodiment and to the other embodiments of the present invention is the simple and effective modulated reflectance circuits and encoding strategies that can be produced with low cost printing. This eliminates any need for use of expensive semiconductor chips in the present invention.

Another practical device incorporating modulated reflectance is a related device that allows remote reading of pneumatic tire conditions. This embodiment can be incorporated into tires at time of manufacture that could provide the current condition of the tire, including, for example, tire pressure, temperature, tread wear and serial number.

The present invention partially is enabled by the development of technology that allows the ink-jet printing of passive electrical components such as resistors, capacitors, inductors, and antennas. This technology helps to minimize the monetary costs and simplifies the creation of identification labels described above. Two companies from which this technology is available are SkyCross, Inc. of 300A North Drive, Melbourne, Fla. 32934, and Flint, Inc., of 4600 Arrowhead Drive, Ann Arbor, Mich. 48105. However, it should be understood that any method of producing simple, low-cost, passive components can be used with the present invention.

Figure 1:
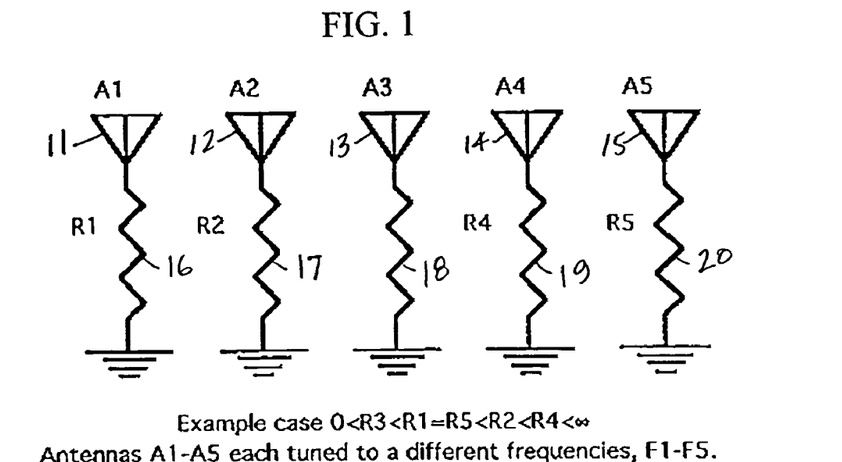
FIG. 1 is a schematic representation of reflectance antennas according to the present invention in which various resistances are used to attenuate the reflectance.

One embodiment of the present invention is the use of multi-frequency RF interrogation of a label according to the present invention from an interrogation RF base unit. As shown in FIG. 1, a label may contain multiple antennas. Each antenna 11, 12, 13, 14, and 15 has associated with it an impedance 16, 17, 18, 19 and 20, respectively connected to the feed points of the antennas, that serve to control the characteristics of the reflected signal for the particular resonant frequency of an antenna 11, 12, 13, 14, or 15. Of course, it will be obvious to those skilled in the art that either more or fewer than five antennas could be used depending on the particular application of the invention. As an example, one antenna, tuned to respond uniquely, (e.g. full power reflectance in phase or 180 degrees out of phase) at several different frequencies would also represent the technology.

In actual use, each antenna 11, 12, 13, 14, and 15 also is tuned to reflect an electromagnetic wave of a specific resonant frequency, F1, F2, F3, F4 and F5. The associated load impedances 16, 17, 18, 19 and 20 determine each antenna's ability to reflect its tuned frequency. That is, the more closely a particular load impedance matches the feed point impedance of its antenna, the less energy will be reflected by that antenna. This is because when the load impedance matches the feed point impedance, the energy of the incident wave is transferred to the load rather than being reflected.

Figure 2:
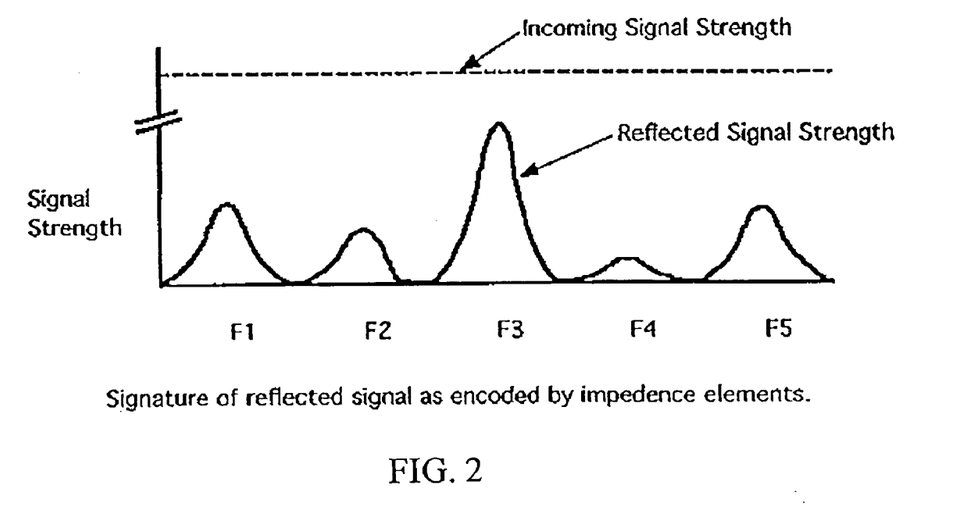
FIG. 2 is a qualitative graph of possible signal amplitudes from the antennas shown in FIG. 1.

FIG. 2 is a qualitative plot illustrating this, where relative signal strengths are plotted for the resonant frequency of each antenna 11, 12, 13, 14, and 15 (FIG. 1), given that the load impedances 16, 17, 18, 19 and 20 (FIG. 1) each are of a different value. As seen in this FIG. 2, a signature is created in the reflected signal that can be distinguished from other signals in the receiver. A very large number of signatures can be created since there are large numbers of combinations of load impedances and frequencies usable with the present invention.

As stated, the relative amplitude of reflected signals is used to determine a code identifying a particular user. By having a select frequency that resulted in no attenuation, a calibration amplitude reflected at that frequency can be used as a reference amplitude. Therefore, the other frequencies' reflected amplitudes are judged in relation to the reference amplitude. The attenuation of other frequencies is accomplished by creating feed point-load impedance mismatches. In terms of amplitude alone three conditions result in the greatest amplitude reflected to a receiver: a load impedance of zero, a short, or from an impedance mismatch of infinity, an open, on the particular antenna. Thus, Short=no attenuation, and no phase change, $\phi=0°$; Open=no attenuation, but a phase change from the incoming wave, $\phi=180°$.

The least reflected amplitude is from an antenna whose load impedance matches the feed point impedance of the antenna. In this case, no energy is reflected to a receiver. Varying the load impedances provides the mismatch between these two extreme values varies the fraction the total incident RF energy in the load impedance, varying the amplitude of the reflected wave as illustrated in FIGS. 1 and 2.

Figure 3A:
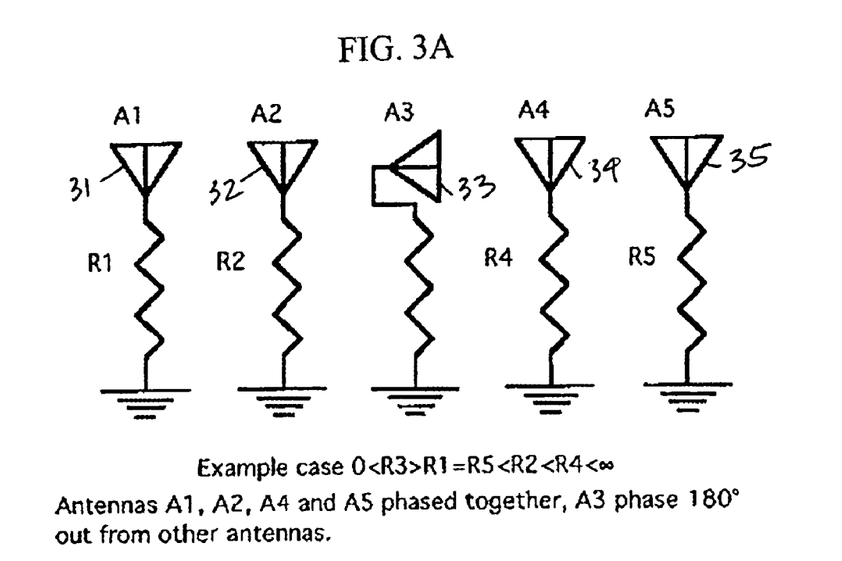
FIG. 3A is a schematic representation of reflectance antennas with associated impedances and containing antenna phasing.
Figure 3B:
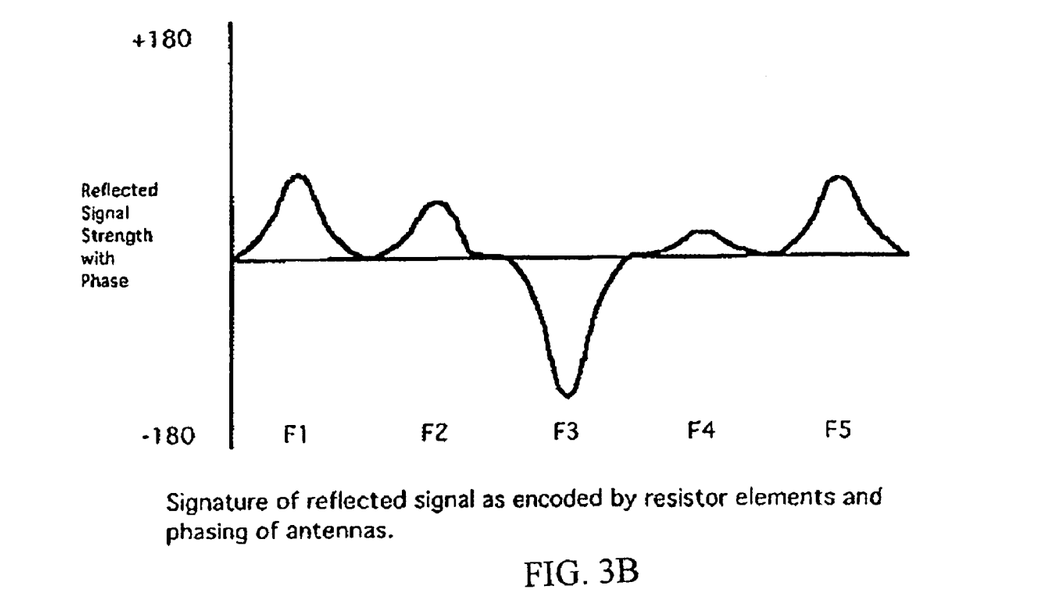
FIG. 3B is a qualitative graph of possible signal amplitudes from the antennas shown in FIG. 3A FIGS. 4A, 4B and 4C illustrate delay circuit arrangements used with the present invention.

Although coding can be readily accomplished using reflected amplitudes, it can also be accomplished using wave polarization and phase information. Polarization information is encoded by physical arrangement antennas, and phase information by design of the load impedance of a single antenna. In the polarization technique, the antenna array is set up with antennas in different physical orientations, such as linear as vertical, and horizontal or circular as right and left circular polarization, relative to each other, which can be discriminated by the receiver. This is illustrated in FIG. 3A, with antennas 31, 32, 34, and 35 arranged vertically and antenna 33 arranged horizontally. In the phase technique, the impedance mismatches of zero and infinity both cause 100% reflection of the incident RF energy. However, as previously discussed, the phase of the reflected frequency differs by 180° for the two conditions. Again, a reference frequency can be used to determine whether a reflected signal is in phase or 180° out of phase. These two-phase states can then be used as a binary code that can be exploited in number of ways in the present invention. One way is from an orthogonal basis, such as the Walsh code. By using both physical antenna phases, two bases can be formed where, depending on the information sought, a different polarization is used on the interrogating signal. For example, one polarization may provide product identification, and the other polarization may provide the lot number of the product. FIG. 3B shows a qualitative graph of reflected signals from each antenna shown in FIG. 3A along with phase.

Figure 4A:
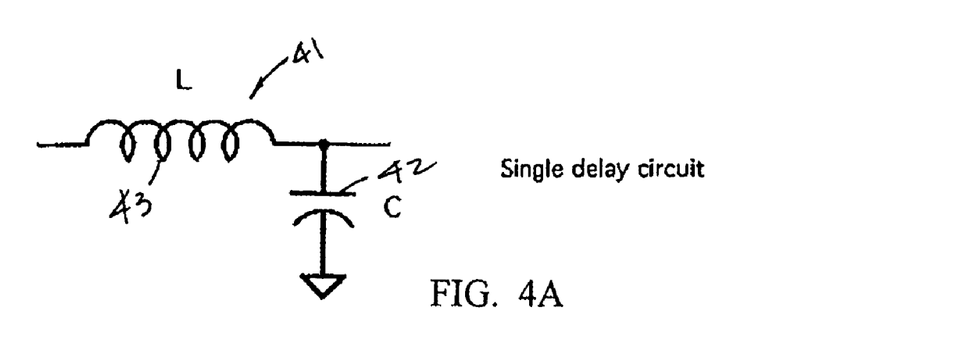
Figure 4B:
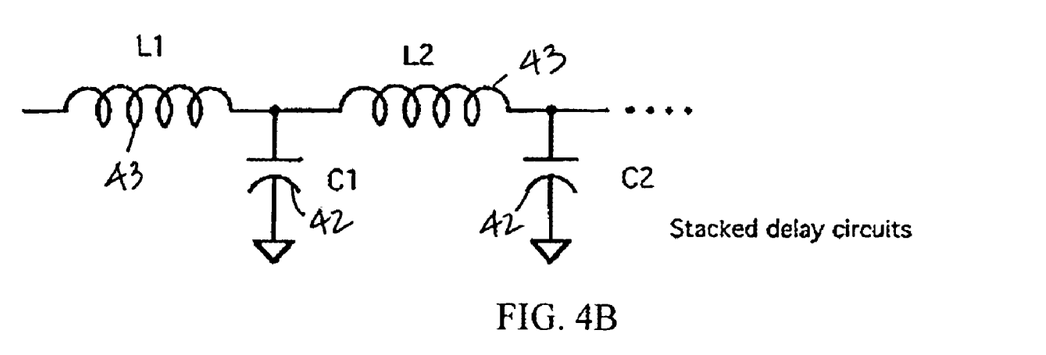
Figure 4C:
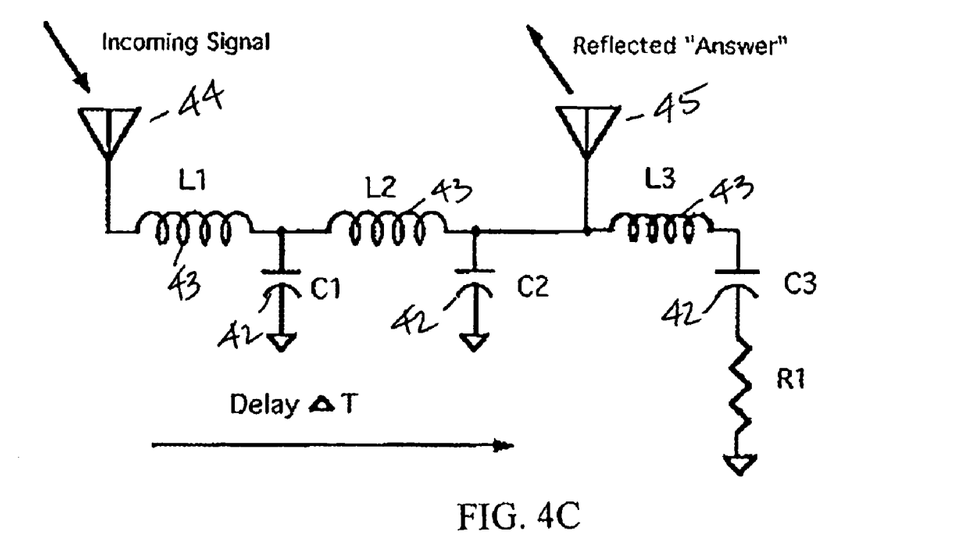

In addition to the above-described signaling techniques, different time delays can be used, as shown in FIGS. 4A–C. For a particularly frequency, an antenna can have associated with it a time delay circuit 41, having a capacitance 42 and inductance 43. The matching impedance of the antenna is either an open, a short, or an attenuating load impedance. However, the time required for the reflected signal to be reradiated from the circuit would be unique. The delay circuit in the antenna can be as simple as long printed cable-type structure, or it can be inductors 43 and/or capacitors 42 creating the time delay, where the delay is controlled by varying the values of "L" and "C" in the circuit.

The delay circuit also can be a cascade of multiple time delay elements to increase the delay time, as shown in FIG. 4B. In this embodiment, as shown in FIG. 4C, the information is encoded by illuminating an antenna tag 44 with RF energy, turning off the RF source, and measuring the time required for the antenna tag 45 to respond. This measured time delay provides information and identification through another "letter" in an encoding "alphabet."

Another embodiment of the present invention involves the use of a capacitor in the load circuit in such a way that a charge stored on the capacitor affects the frequency response of the load circuit. This change in frequency response of an antenna provides another technique for encoding information for practice of the present invention.

The charge in these capacitors can be changed remotely through application of several techniques including direct contact with electrodes on a label, inductive charging and discharging through the use of printed inductive coils on the label, and by RF charging from a distance. This ability to re-encode labels is useful for updating information such as expiration dates, new pricing and new disposition of a particular item. As will be discussed below, this technique also can be used to disable a modulated reflectance tag.

In practice of the invention, capacitors can be used as a primitive clock. The amount of time a capacitor takes to become fully discharged depends on the amount of charge stored in the capacitor and the value of the resistance through which it is discharging. The discharge rate can be hard wired into the tag circuit to meet specified requirements. To improve the accuracy of the clock function, the interrogating RF base unit can observe the rate of discharge over time, comparing the rate of its own internal clock, and develop a calibration rate for a specific label. Label calibration can account for variations due to differences in circuit parameters between different labels. This calibration technique relaxes the requirements of accuracy and precision of the label manufacturing process, since the interrogating unit can "learn" the discharge rate of a specific label. The technique also can be used to indicate when a "trigger" capacitor charge level has been reached. Commercial items such as expiration dates and freshness can be monitored in this way.

Figure 5A:
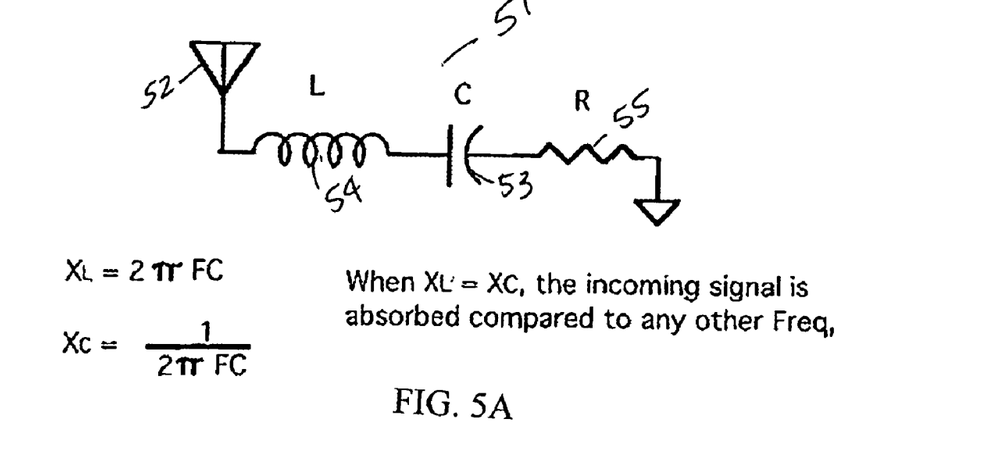
FIGS. 5A and 5B illustrate oscillating resonant circuits used in practice of the present invention.
Figure 5B:
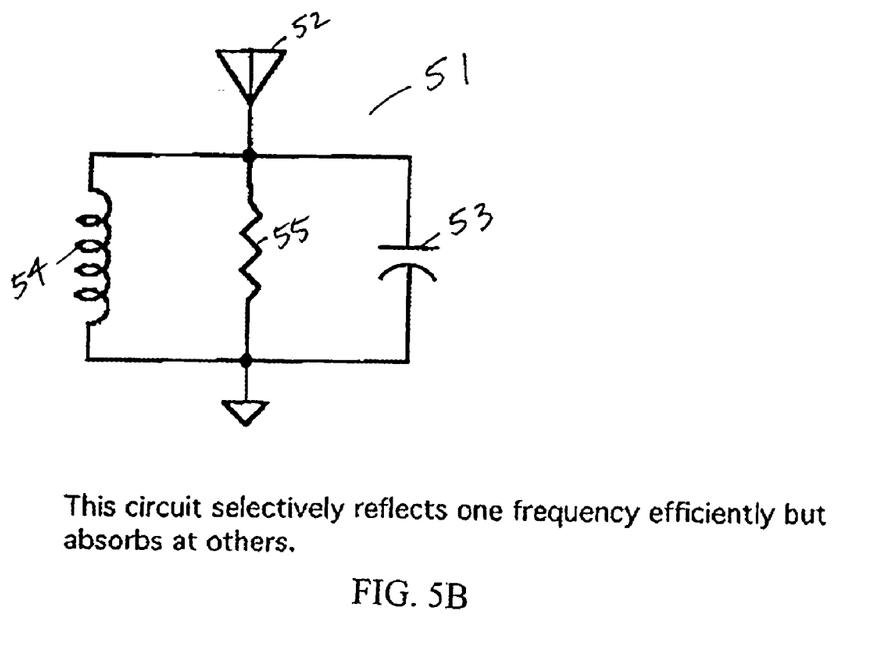

Still another embodiment of the present invention uses oscillating circuits, that, when activated by an interrogating RF base unit signal, cause a complex, pulsating signal to be reflected, which is another form of modulation. This pulsating signal provides another method of encoding that adds to the "alphabet" that a label can use to communicate to an RF bar code system. Typical oscillating circuits are constructed easily using antennas, capacitors, inductors, and resistances that also can be easily printed. As shown in FIGS. 5A and 5B, these same oscillating circuits 51 can be made to be frequency specific through proper selection of the values of capacitors 53, inductors 54 and resistances 55, in either the series connected configuration of FIG. 5A, or the parallel connected configuration of FIG. 5B. This means that the reflecting antenna 52 either absorbs or reflects in the presence of a specific frequency of incoming RF signals. This ability also is useful for expanding the selectivity of the reflecting antennas 52 and the "alphabet" of encoding "letters."

In summary, it should now be clear to those with skill in this art that several techniques exist with which to create complex, unique signatures for RF labels using modulated reflectance technology. These techniques include, but are not limited to, using a number of antennas tuned to slightly different frequencies, using antennas turned either fully off and fully on, using antennas with variable reflectance tuned by variable impedance loads of various values, by using pulsating reflected signals from antennas with oscillating circuits driving the antennas, delay-line circuits on certain antennas, using pulsating circuits for time variant signals, and phased antenna configurations that reflect phased signals.

Among the highly useful features of the present invention is the ability to locate, relative to a known reference point, a particular tag or label in the physical environment. Identifying the location of particular tag, be it on an item of commerce for sale, on a piece of equipment, on a medicine bottle, or on a doctor in a hospital, for example, can be achieved by known radar techniques and triangulation using data collected by multiple RF base stations. Additionally, many of the same features can be accomplished through the use of a single wide-frequency antenna with associated tuned circuits.

Another important application of the present invention is use on grocery or department store merchandise. In this application, a customer can have his items scanned and paid for in a single step. Determining the items in a shopping cart, and the price of each item, only involves interrogating the identification labels on the merchandise with modulated reflectance as previously described. The issue of paying for the merchandise is slightly more complex, as it requires uniquely identifying the purchaser and associating the purchaser with a bank account that is to be debited for the price of the merchandise.

The solution to this problem is based on what is known as public key cryptography, where two "keys" for encoding and decoding transmitted information are created for a user. The first key is called the public key, which is used for encoding information intended for use by the user. As the name implies, this is not a secret key, and anyone can have access to it, such as banks and creditors. However, after encoding with a public key, the encoded information cannot be decoded by anyone other than the user using a private key. This private key information can be encoded with a modulated reflectance label on something like a credit card, which the user would carry on his person. This card would be read along with the other items that the user wants to purchase.

The information from the private key is used to unlock pertinent bank information, and the transaction is completed transparently with regard to the user. Anti-fraud techniques, such as a PIN, or requiring a PIN could be employed for greater financial security, but such techniques are not transparent to the user. Another technique is to have the private key label split physically into two parts that could be carried in different locations, and the user would have to be in possession of both parts to validate and complete a purchase.

Still another application of the present invention is in remote telemetry applications. One such remote telemetry application is in the monitoring of the condition of automobile, truck, and aircraft tires. In this application, a modulated reflectance device or tag is placed inside a pneumatic tire to reflect information on air pressure, temperature, and even remaining tire tread depth. The tag is interrogated remotely, and the various readings can be displayed at the dashboard of the vehicle in real time. The tag either can be attached to the inner tire surface or wheel rim using adhesive, or the tag can be permanently vulcanized into the tire structure at the time of manufacture.

Figure 6A:
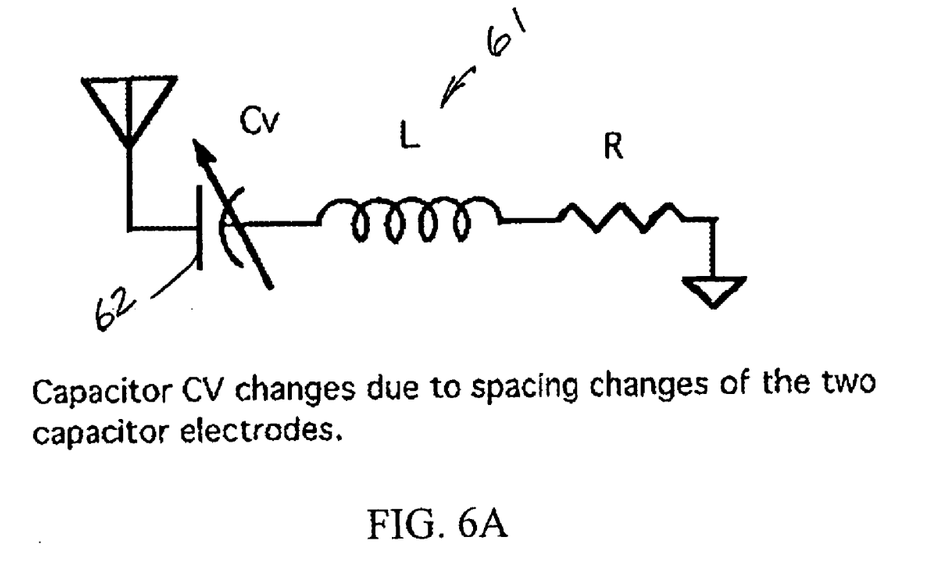
FIGS. 6A and 6B illustrate ways of measuring air pressure in a pneumatic tire using the present invention.
Figure 6B:
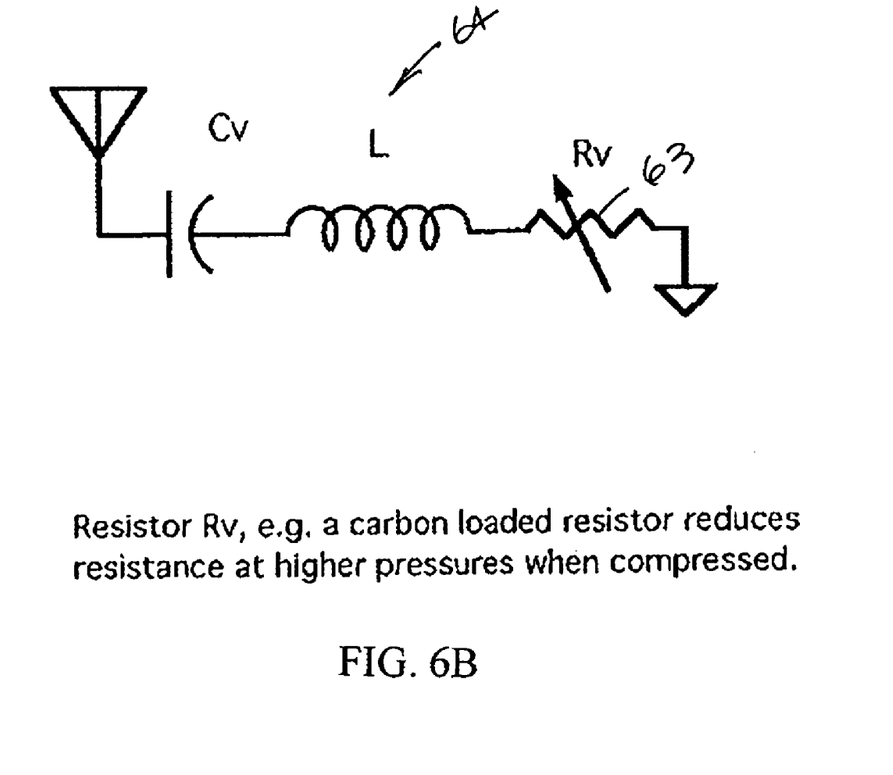

Tire pressure is detected using a variable capacitor constructed of a compressible film with conductive metal electrodes on each side of the film. As the air pressure changes, the spacing of the electrodes also changes, changing the capacitance. This capacitance alters the signature of the reflectance properties of the antenna circuit. For example, as shown in FIG. 6A, one way is to have the resonant frequency of a "tank" circuit 61 changed when the capacitance of capacitor 62 changes, and thus encodes pressure information that is communicated to the dashboard display unit. FIG. 6B shows a schematic of use of pressure sensitive resistor 63 as a pressure transducer that also changes the resonant frequency of the "tank" circuit 64.

Tire temperature is measured easily with a wide variety of well-known temperature devices such as temperature sensitive resistance elements and thermocouples. This type of resistance also changes the resistance of a "tank" circuit according to the temperature of the tire.

Figures 7A, 7B:
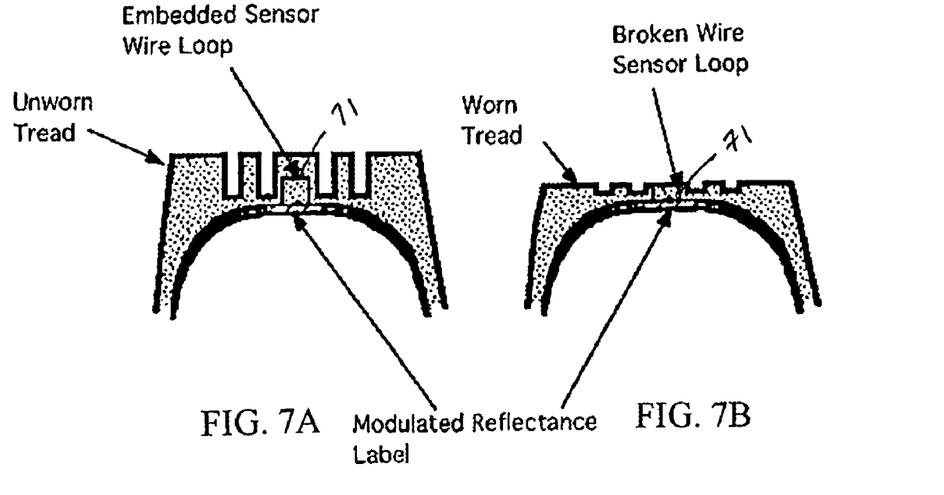
FIGS. 7A and 7B illustrate use of wire loop an antenna according to the present invention to measure tire tread wear.
Figure 8A:
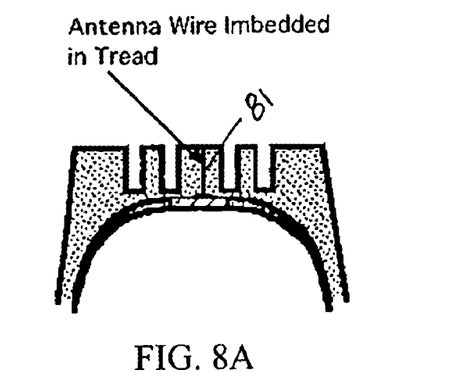
FIGS. 8A and 8B illustrate use of a single wire as an antenna according to the present invention to measure tire tread wear.
Figure 8B:
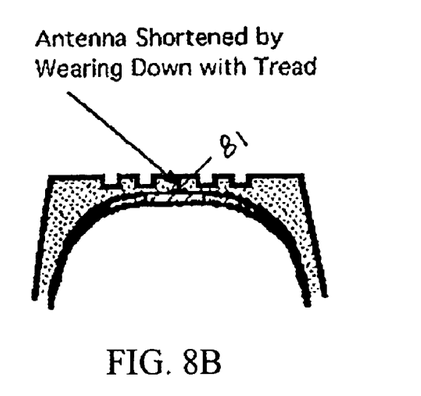

Tire tread wear is sensed by various means including, as illustrated in FIGS. 7A and 7B, placement of a thin wire loop 71 embedded into the tire tread at an appropriate level. When the tread is worn down to the level of thin wire loop 71 it is broken, changing the response of the modulated reflector circuit. Another tread wear indicator is shown in FIGS. 8A and B. As shown, a thin wire 81 is embedded radially into a tire's tread, and used as an antenna for the modulated reflector circuit. In this case, as the tread wears, it shortens thin wire 81, changing the antenna's frequency response. This is equivalent to the previously described changing of an antenna's feed point impedance mismatch.

The serial number of tires can be encoded into the modulated reflectance circuitry. This allows the isolation of tires for recall purposes in the case of defective tire lots, or for the tire factory to conduct research on tire batches released to the public for quality control purposes.

While the preceding discussion describes example tire telemetry applications for modulated reflectance, the technique can be used for many other telemetry applications in which sensor capability is required. Many of the other applications will include environments where it is difficult or impractical to have access to the sensor package for battery replacement or other maintenance.

In the case of items of commerce, often it will be useful to disable or alter labels at the time of purchase so that the store will know that the item has been purchased and that it is no longer in the inventory. In addition, many customers may desire to have privacy when purchased items are in their possession, and do not want these items to be interrogated without their permission. While labels according to the present invention can be easily mechanically torn, and thus disabled, a non-mechanical RF method is highly desirable.

Such an RF disabling can be easily accomplished by use of a fusible link inserted in the reflector circuitry of the label that is opened by exposure to a specific RF frequency input from a base station. In another technique, an inductive coil can be activated by a specific frequency RF signal such that a special magnetic conductive link is attracted toward the inductive coil and severed, disabling the label.

It is also possible to use electromagnetic energy for disablement by an arc or localized heating. The arc or heating produces a change in the value of a circuit element on the label, such as a short circuit (low resistance) or an open circuit (high resistance). This arcing or heat also could be used to initiate a chemical or physical reaction that itself causes a local short or open, or allows the reaction to propagate and change elements in other nearby circuits. For this method of circuit destruction to be effective, it must be integral to the functional modulated reflectance circuit in some manner. The destruct signal can be distinguished by the label circuitry by (1) being of higher power, or (2) at a different frequency, or (3) of a unique code from the normal mode of operation of the functional circuit.

In actual practice of the present invention, it is important to localize the energy deposition in order to obtain maximum affect from a limited amount of input energy. To achieve this localization in an actual label, it is necessary to print conductive particles coated with a thin layer of a more insulating material. When printed, these particles would be in contact, and the energy deposition would be localized to occur in the insulating coating at the points of contact. This would be either a simple arc process, or a more complex chemically assisted reaction could be initiated. Another way to produce a thin insulating layer by printing is done by allowing a surface insulating layer to form on a conductive trace as it cures, oxidizes, or dries, followed by printing a conductive layer over the thin insulating layer. Alternatively, a sufficiently thin insulating layer, either intermediate or active, can be printed on the first conducting layer, instead of having it form there.

Another method of localizing the deposition of energy involves printing a diode with N against P type materials, creating a depletion zone at the contact of the two materials. In reverse bias, the fields are confined to the depletion zone, as is the energy deposition, and the diode is caused to fail, and open the associated circuit.

Of course, any of these can be made as small as printer accuracy permits for energy localization. Any or all of the materials can be chemically active and the contacts where electrical energy is deposited can be of any desired resistance.

In order to prevent unwanted or unintentional disablement of a label, a form of more complex signal than a single frequency or pulse can be used. It is also desirable to require an accurately tuned signal and a form of energy multiplication. This implies a high Q tuned circuit that would build up its oscillation voltage, as power is supplied by the received signal (see FIG. 6). In an inexpensively fabricated device the disabling device needs to measure the frequency of the destruct circuit(s), then transmit a short burst of power at the correct frequency or frequencies.

For even further complexity of the disable signal, more than one tuned circuit can be used with the voltage for destruction requiring all frequencies to be present at the correct times. This destruction scheme also could be implemented using timed pulse codes rather than, or in addition to delay lines (see FIG. 5). It is possible that the destruction could be implemented as a part of the normal functioning circuit, requiring only more power, different coding, or both to effect the desired destruction. It also is possible that the destruct type of mechanism can initiate some other action than, or in addition to changing the functioning of the label's circuit.

In the case of labels according to the present invention being used as wristbands, such as might be used as, for example, as "tickets" in theme parks, hospitals, or at large gatherings of people such as at concerts, outdoor stage shows, and ski resorts. In these uses, the wristbands are designed so that they must be broken to be removed from the wrist. This breaking process can break critical circuits in the process if that is desired for a particular application.

The wristbands and RF identification imprinted tickets as used in applications such as those listed above, can have an additional feature, if desired, that provides a simple form of two-way communication. In this case, the wristband or ticket has a special tear-off tab, such that when it torn off, the circuit on the wristband or ticket is altered. This alteration results in a change in the reflected signal signature from the circuit, indicating, for example, distress of the wearer or holder. This could be a most useful feature, not only in the hospital environment, but also for visitors to theme parks and persons at large concerts. This feature provides a simple way for persons to obtain help quickly, by simply tearing off a tab. Use of the previously described location techniques allows a person to be located so help can be delivered expeditiously.

As previously described, the use of a capacitor charging process allows the changing of information stored in a modulated reflectance label circuit. In order to effect such a change to a circuit, the charge on the capacitor has to be changed in some known way. However, if the charge on the capacitor is put into an unknown or random state, the label will no longer provide any useful reflected information to the base unit. The label circuit will continue to produce a modulated reflectance signal on interrogation, but it would be useless due to the unknown charge state of the capacitor.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An identifying coding apparatus employing passive modulated reflectance technology comprising:
   a base station emitting a RF signal;
   a tag, located remotely from said base station, including:
   a substrate;

at least one antenna; and, a network, consisting only of passive components, connected to said antenna, said passive components selected from the group consisting of resistors, capacitors, inductors, and connecting conductors formed by printing said passive components onto said substrate, where said network is configured to reflect back to said base station the RF signal modulated to be indicative of characteristics related to said tag.

2. The identifying coding apparatus as described in claim 1, wherein said tag is configured as a label to be applied to an item of manufacture.

3. The identifying coding apparatus as described in claim 2, wherein said label is situated inside a pneumatic tire, and contains a pressure sensor, a temperature sensor and a tire tread wear sensor.

4. The identifying coding apparatus as described in claim 1, wherein said substrate is flexible.

5. The identifying coding apparatus as described in claim 4, wherein said tag is configured as a label to be applied to an item of manufacture.

6. The identifying coding apparatus as described in claim 4, wherein said label is situated inside a pneumatic tire, and contains a pressure sensor, a temperature sensor and a tire tread wear sensor.

7. The identifying coding apparatus as described in claim 1, wherein said network is configured to enable said reflected modulated signal to determine the location of said tag.

8. The identifying coding apparatus as described in claim 1, wherein said network is configured to enable said reflected modulated signal to identify an entity to which said tag is associated.

9. The identifying coding apparatus as described in claim 1, further comprising means for disabling operation of said tag.

10. The identifying coding apparatus as described in claim 9, wherein said means for disabling comprises a fusible link on said tag that opens upon receipt by said tag of a particular RF signal from said base station.

11. The identifying coding apparatus as described in claim 9, wherein said means for disabling comprises said substrate is configured to enable said tag to be broken apart.

12. The identifying coding apparatus as described in claim 1, further comprising a tab that when torn off said tag affects said modulated reflected signal is such a way as to indicate a preselected event.

13. The identifying coding apparatus as described in claim 1, wherein said network is configured to obtain a binary code in said modulated reflected signal that identifies the particular user of the tag.

14. The identifying coding apparatus as described in claim 13, wherein said at least one antenna comprises two antennas, a first of said two antennas being out of phase with a second of said two antennas to induce said binary code in said modulated reflected signal.

15. The identifying coding apparatus as described in claim 13, wherein said network includes time-delay circuits comprising combinations of inductances and capacitances to induce said binary code in said modulated reflected signal.

16. The identifying coding apparatus as described in claim 13, wherein said network includes varying impedances connected to said at least one antenna to induce said binary code in said modulated reflected signal.

* * * * *